(12) United States Patent
Pritchard

(10) Patent No.: US 10,766,349 B2
(45) Date of Patent: Sep. 8, 2020

(54) HYBRID TRANSFER CASE

(71) Applicant: BorgWarner Inc., Auburn Hills, MI (US)

(72) Inventor: Larry A. Pritchard, Macomb, MI (US)

(73) Assignee: BorgWarner Inc., Auburn Hills, MI (US)

( * ) Notice: Subject to any disclaimer, the term of this patent is extended or adjusted under 35 U.S.C. 154(b) by 32 days.

(21) Appl. No.: 15/943,954

(22) Filed: Apr. 3, 2018

(65) Prior Publication Data

US 2018/0290533 A1      Oct. 11, 2018

Related U.S. Application Data

(60) Provisional application No. 62/481,919, filed on Apr. 5, 2017.

(51) Int. Cl.
| | |
|---|---|
| *B60K 6/48* | (2007.10) |
| *B60K 6/365* | (2007.10) |
| *B60K 6/52* | (2007.10) |
| *B60K 17/346* | (2006.01) |
| *B60K 23/08* | (2006.01) |
| *B60K 6/387* | (2007.10) |

(Continued)

(52) U.S. Cl.
CPC .............. *B60K 6/365* (2013.01); *B60K 6/387* (2013.01); *B60K 6/48* (2013.01); *B60K 6/52* (2013.01); *B60K 6/547* (2013.01); *B60K 17/3462* (2013.01); *B60K 17/35* (2013.01); *B60K 23/0808* (2013.01); *F16H 3/725* (2013.01); *B60K 2006/4808* (2013.01); *B60K 2023/085* (2013.01); *B60K 2023/0841* (2013.01); *B60K 2023/0858* (2013.01); *F16H 2057/02043* (2013.01); *Y02T 10/6221* (2013.01); *Y02T 10/6265* (2013.01)

(58) Field of Classification Search
CPC ........... F16H 3/725; F16H 2057/02043; Y02T 10/6221; Y02T 10/6265; B60K 6/365; B60K 6/387; B60K 6/48; B60K 6/52; B60K 6/547; B60K 17/35; B60K 17/3462; B60K 23/0808; B60K 2006/4808; B60K 2023/085; B60K 2023/0841; B60K 2023/0858
USPC ............................................................. 475/5
See application file for complete search history.

(56) References Cited

U.S. PATENT DOCUMENTS 6,244,368 B1 * 6/2001 Ando ..................... B60K 6/48
                                                              180/65.25
6,302,227 B1 * 10/2001 Takemura .............. B60K 6/365
                                                              180/65.25

(Continued)

*Primary Examiner* — Leslie A Nicholson, III
(74) *Attorney, Agent, or Firm* — Young Basile Hanlon & MacFarlane, P.C.

(57) ABSTRACT

A powertrain for a vehicle includes an internal combustion engine and a transfer case. The transfer case includes a primary output shaft, an electric motor, and a planetary gear set. The primary output shaft receives engine torque from the internal combustion engine. The electric motor includes a rotor and a stator. The planetary gear set includes a sun gear rotatably fixed to the rotor, a ring gear, planet gears arranged radially between and engaging the sun gear and the ring gear, and a planet carrier coupled to the planet gears and rotatably fixed to the primary output shaft. The ring gear is selectively groundable for selectively transferring torque between the electric motor and the primary output shaft.

9 Claims, 7 Drawing Sheets

(51) Int. Cl.
   B60K 17/35 (2006.01)
   B60K 6/547 (2007.10)
   F16H 3/72 (2006.01)
   F16H 57/02 (2012.01)

(56) References Cited

U.S. PATENT DOCUMENTS

| | | | |
|---|---|---|---|
| 8,424,622 B2* | 4/2013 | Ideshio | B60L 50/16 |
| | | | 180/65.225 |
| 9,561,719 B2* | 2/2017 | Lo | B60K 6/387 |
| 10,202,031 B2* | 2/2019 | Lo | B60K 17/28 |
| 2015/0008057 A1* | 1/2015 | Lo | B60K 6/52 |
| | | | 180/165 |

* cited by examiner

HYBRID TRANSFER CASE

CROSS-REFERENCE TO RELATED APPLICATION(S)

This application claims priority to and the benefit of U.S. Provisional Application No. 62/481,919, filed Apr. 5, 2017, the entire disclosure of which is incorporated by reference herein.

TECHNICAL FIELD

The present disclosure relates to torque transfer systems for vehicle powertrains and, in particular, to transfer cases for hybrid powertrains.

BACKGROUND

Four-wheel drive or all-wheel drive vehicles may include a torque transfer device, such as a transfer case, for transferring torque from a drive source (e.g., an engine or transmission) to an output shaft (e.g., a rear output shaft for driving rear wheels of a vehicle) and selectively to another output shaft (e.g., a front output shaft for additionally driving front wheels of the vehicle). Such a drive source is typically an internal combustion engine, which is connected to a transmission and, in turn, the transfer case. Hybrid vehicles or hybrid powertrains include two different drive sources that may include an internal combustion engine and one or more electric motors, which cooperatively provide drive torque for moving the vehicle. For example, the vehicle or powertrain may operate in various modes with drive torque being provided by the internal combustion engine alone, by the electric motor alone, or both the internal combustion engine and the electric motor.

SUMMARY

Disclosed herein are implementations of a powertrain and torque transfer mechanisms having an electric motor. In one implementation, a powertrain for a vehicle includes an internal combustion engine and a transfer case. The transfer case includes a primary output shaft, an electric motor, and a planetary gear set. The electric motor includes a rotor and a stator. The planetary gear set includes a sun gear rotatably fixed to the rotor, a ring gear, planet gears arranged radially between and engaging the sun gear and the ring gear, and a planet carrier coupled to the planet gears and rotatably fixed to the primary output shaft. The ring gear is selectively groundable for selectively transferring torque between the electric motor and the primary output shaft. The primary output shaft receives engine torque from the internal combustion engine independent of the planetary gear set.

The transfer case may include a housing and a locking ring that is movable axially between a forward position in which the locking ring grounds the ring gear to the housing and a rearward position allowing the ring gear to rotate freely of the housing. The transfer case may include a secondary output shaft, a secondary torque transfer mechanism for selectively transferring torque between the primary output shaft and the secondary output shaft, and an actuation system for selectively grounding the ring gear and selectively operating the secondary torque transfer mechanism. The transfer case may be a single-speed transfer case. The electric motor may be concentric with the primary output shaft.

In an implementation, a transfer case includes a primary output shaft, a secondary drive source, and a planetary gear set. The primary output shaft is configured to receive torque from an external drive source that is external to the transfer case. The second drive source is integral with the transfer case. The planetary gear set selectively operatively couples the second drive source to the primary output shaft for transferring torque therebetween. The planetary gear set is concentric with the primary output shaft and includes a sun gear rotatably fixed to an output of the second drive source, a ring gear that is selectively groundable, planet gears arranged radially between and engaging the sun gear and the ring gear, and a planet carrier coupled to the planet gears and rotatably fixed to the primary output shaft.

In an implementation, a transfer case includes a primary output shaft, an electric motor, and a planetary gear set. The primary output shaft receives torque from a drive source external to the transfer case, and provides a primary torque output of the transfer case. The electric motor includes a rotor and a stator that are internal to the transfer case. The planetary gear set includes a sun gear rotatably fixed to the rotor, a ring gear, planet gears arranged radially between and engaging the sun gear and the ring gear, and a planet carrier coupled to the planet gears and rotatably fixed to the primary output shaft. The ring gear is selectively groundable for selectively transferring torque between the electric motor and the primary output shaft.

In an implementation, a powertrain for a vehicle includes an internal combustion engine and a transfer case. The transfer case includes a primary output shaft, a drive motor, and a planetary gear set. The primary output shaft receives torque from the internal combustion engine. The internal combustion engine is external to the transfer case. The drive motor is integral with the transfer case. The planetary gear set selectively operatively couples the drive motor to the primary output shaft for transferring torque therebetween. The planetary gear set is concentric with the primary output shaft and includes a sun gear rotatably fixed to an output of the drive motor, a ring gear that is selectively groundable, planet gears arranged radially between and engaging the sun gear and the ring gear, and a planet carrier coupled to the planet gears and rotatably fixed to the primary output shaft.

In an implementation, a vehicle powertrain includes an engine, an electric motor, and a transfer case. The transfer case includes a housing and a primary output shaft. The engine is external to the housing and is selectively coupleable to the primary output shaft to transfer torque therebetween. The electric motor is internal to the housing and is selectively coupleable to the primary output shaft to transfer torque therebetween. The powertrain is selectively operable in each of an electric drive mode, an electric regeneration mode, an engine drive mode, a combined engine and electric drive mode, and a combined engine drive and electric regeneration mode. In the electric drive mode, the engine is not selectively coupled to the primary output shaft, and the electric motor is coupled to the primary output shaft to rotate the primary output shaft. In the electric regeneration mode, the engine is not selectively coupled to the primary output shaft, and the electric motor is selectively coupled to the primary output shaft to be rotated by the primary output shaft. In the engine drive mode, the electric motor is selectively coupled to the primary output shaft to rotate the primary output shaft, and the electric motor is not selectively coupled to the primary output shaft. In the combined engine and electric drive mode, the engine and the electric motor are both selectively coupled to the primary output shaft to rotate the primary output shaft. In the combined engine drive and electric regeneration mode, the engine is selectively coupled to the primary output shaft to rotate the primary output shaft, and the electric motor is selectively coupled to the primary output shaft to be rotated by the primary output shaft.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
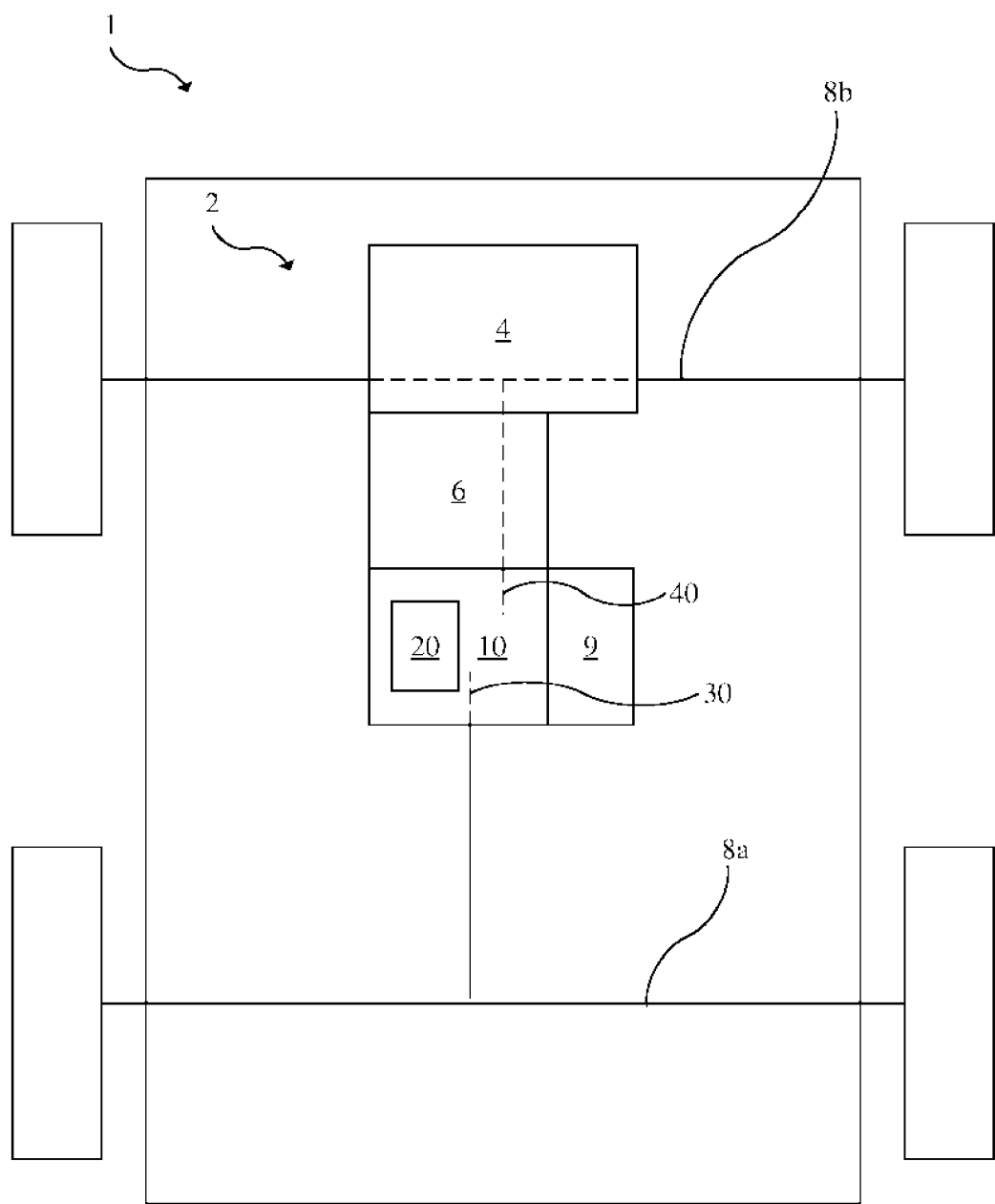
FIG. 1 is a schematic view of a vehicle having an exemplary transfer case.
Figure 2:
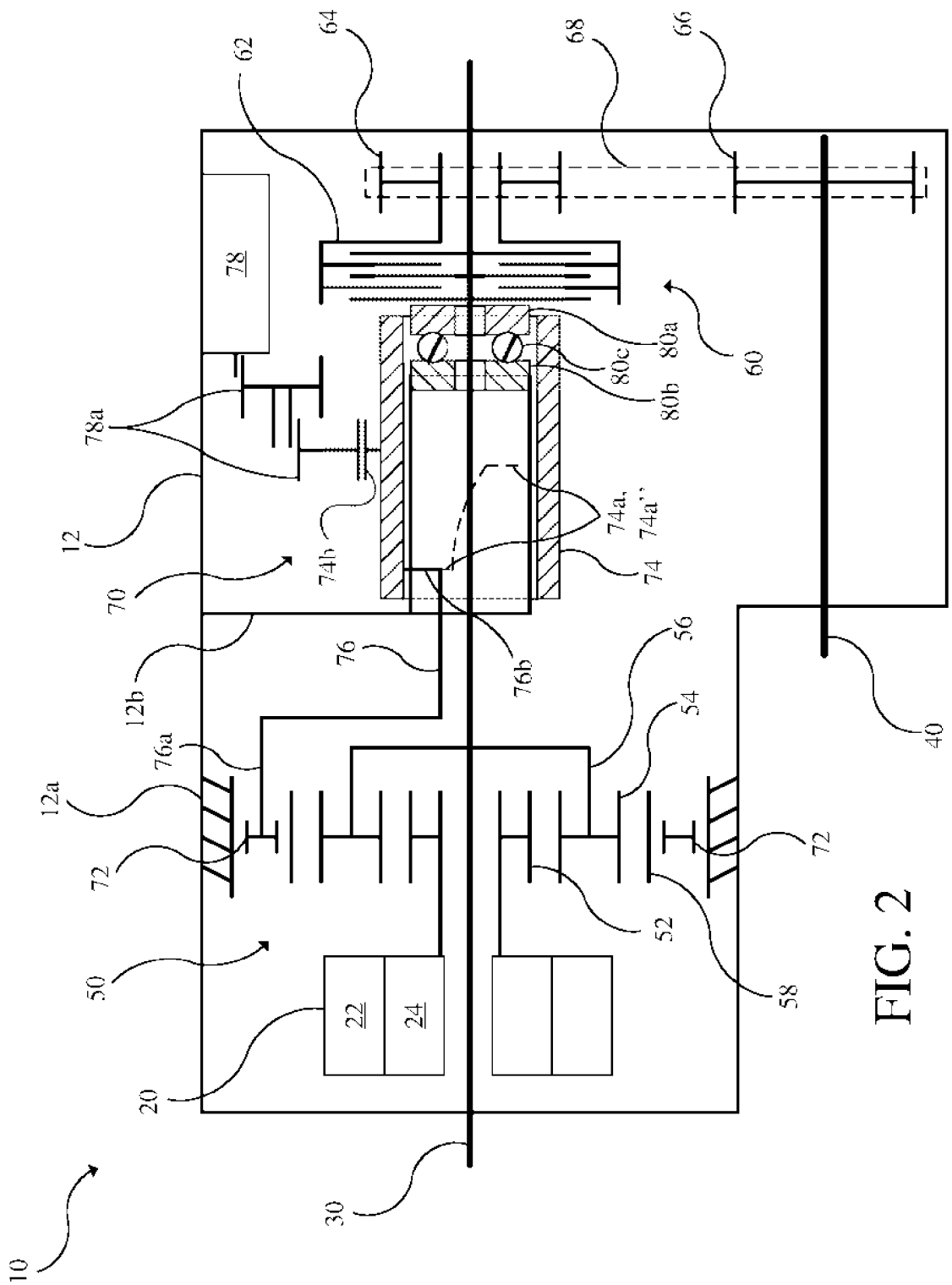
FIG. 2 is a schematic cross-sectional view of the transfer case of FIG. 1 shown in a first configuration.
Figure 3:
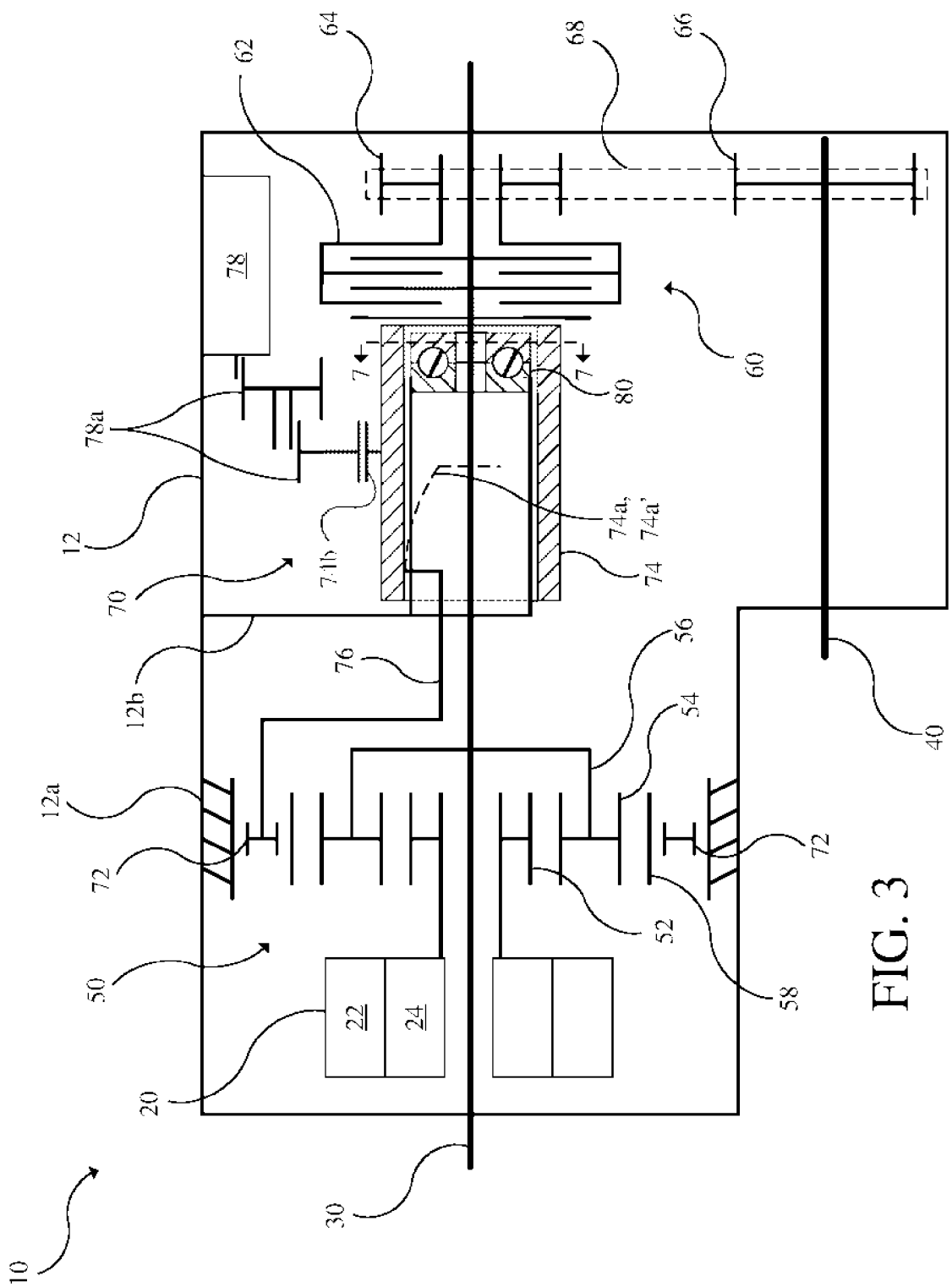
FIG. 3 is a schematic cross-sectional view of the transfer case of FIG. 1 shown in a second configuration.

As shown in FIG. 1, a vehicle 1 includes a powertrain 2 for moving the vehicle 1. The powertrain 2 generally includes an engine 4, a transmission 6 operatively connected to the engine 4, and a transfer case 10. The transfer case 10 transfers torque from the transmission 6 to a rear axle 8a and selectively transfers torque to a front axle 8b. The engine 4 may, for example, be an internal combustion engine (e.g., a gasoline or diesel engine), which functions as an external drive source to the transfer case 10, which provides drive torque (e.g., engine torque) to the transfer case 10. The transmission 6 may, for example, be a ten-speed transmission (e.g., having ten forward drive gears and a single rear drive gear). The rear axle 8a and the front axle 8b may each be or include a single shaft (e.g., an axle) and/or multiple shafts (e.g., half-axles or half-shafts). Alternatively, the transfer case 10 may transfer torque to the front axle 8b and selectively to the rear axle 8a.

The transfer case 10, in addition to transferring torque from the transmission 6 to the rear axle 8a and selectively to the front axle 8b, is additionally configured to transfer torque between an electric motor 20 (e.g., drive motor or motor-generator) and the rear axle 8a and the front axle 8b. The electric motor 20 functions as another drive source (e.g., internal or integral drive source) for the transfer case 10, which is internal or integral with the transfer case 10. The electric motor 20 may be powered by a battery 9 of the vehicle 1, and may also charge the battery 9 (e.g., the electric motor 20 functioning as a generator or motor-generator).

The vehicle 1 additionally includes one or more controllers 3, which include appropriate components (e.g., processor, memory, circuitry, and/or sensors) for controlling operation of the transfer case 10, including transferring electric power between the electric motor 20 and the battery 9. For example, the one or more controllers 3 may operate the transfer case 10 in various drive modes (discussed below) based on various detected conditions (e.g., dynamic conditions of the vehicle 1, state of charge of the battery 9, etc.) and/or user inputs (e.g., selecting four-wheel or all-wheel drive).

Still referring to FIG. 1 and additionally referring to FIGS. 2-6, the transfer case 10 includes the electric motor 20, a primary output shaft 30, and a secondary output shaft 40. The primary output shaft 30 functions as a primary torque output of the transfer case 10 (e.g., to the rear axle 8a or the front axle 8b). The secondary output shaft 40 may function as a secondary output of the transfer case 10 (e.g., selectively to the other of the rear axle 8a or the front axle 8b). The electric motor 20 is selectively operatively coupled to the primary output shaft 30 with a planetary gear set 50 of the transfer case 10 to selectively transfer torque to and from the electric motor 20. The secondary output shaft 40 is selectively operatively coupled (e.g., selectively rotatably coupled) to the primary output shaft 30 with a secondary torque transfer mechanism 60 of the transfer case 10 to transfer torque to and from the secondary output shaft 40. The selective operative coupling of the electric motor 20 to the primary output shaft 30 and the secondary output shaft 40 to the primary output shaft 30 is operated (e.g., performed) by an actuator system 70 of the transfer case 10.

Each of the electric motor 20, the primary output shaft 30, the secondary output shaft 40, the planetary gear set 50, the secondary torque transfer mechanism 60, and the actuator system 70 may be contained in a housing 12 of the transfer case 10. Each of the primary output shaft 30 and the secondary output shaft 40 are supported by the housing via radial bearings (not shown) located, for example, at axial ends thereof and/or at intermediate locations. The primary output shaft 30 may, for example, function as a rear output shaft that drives the rear axle 8a, while the secondary output shaft 40 functions as a front output shaft that drives the front axle 8b. Alternatively, the primary output shaft 30 may function as a front output shaft and the secondary output shaft 40 as a rear output shaft.

The transfer case 10 transmits torque from the transmission 6 independent of the planetary gear set 50. The primary output shaft 30 may function as the input of the transfer case 10, or an intermediate rotating member may function as the input (e.g., coupling to the output of the transmission) and transfer torque to the primary output shaft 30 (e.g., being coaxial therewith). In one example, the transfer case 10 is configured as a single-speed transfer case, which transfers torque from a transmission output (not labeled) at a fixed ratio to outputs of the transfer case 10 (i.e., the primary output shaft 30 and the secondary output shaft 40). The drive ratio is 1:1, such that the rotational speed of the output of the transmission 6 is the same as the primary output shaft 30 and the secondary output shaft 40. Typical transfer cases have multiple drive ratios (e.g., high and low drive ratios) to selectively achieve higher output torque. In the vehicle 1, the transmission 6 has a relatively high number of speeds (e.g., ten), which may allow for and include higher drive ratios in low gears and higher effective output torque from the engine 4 at the rear axle 8a and the front axle 8b. This output torque from the transmission 6 may be supplemented by torque from the electric motor 20, such that sufficiently high cumulative output torque may still be achieved at the rear axle 8a and the front axle 8b without the transfer case 10 having multiple speeds.

In other embodiments, the transfer case 10 may be a multi-speed transfer case, which selectively changes a drive ratio (e.g., between high and low) between the output of the transmission 6 and the output of the transfer case 10. For example, a variation of the transfer case 10 may include another planetary gear set arranged between an input of the transfer case (i.e., receiving torque from the engine 4 or transmission 6) and the primary output shaft 30, which selectively changes between high and low drive ratios.

The electric motor 20 is selectively operatively coupled to the primary output shaft 30 with the planetary gear set 50. The electric motor 20 generally includes a stator 22 fixed to the housing 12 and a rotor 24 that rotates relative to the stator 22. The electric motor 20 may be arranged within the housing 12 of the transfer case 10 with the stator 22 and the rotor 24 being concentric with the primary output shaft 30.

The planetary gear set 50 includes a sun gear 52, planet gears 54 and a planet carrier 56, and a ring gear 58. The sun gear 52 is rotatably fixed to the rotor 24 of the electric motor 20. For example, a forward end or portion of the sun gear 52 may be coupled to the rotor 24 (e.g., with the electric motor 20 being arranged substantially forward of the planetary gear set 50). The ring gear 58 is selectively operable in two states in which the ring gear 58 either rotates freely within the housing 12 (e.g., a first or free state) or is fixed (e.g., grounded) to the housing 12 (e.g., a second, fixed, or grounded state). The planet gears 54 are positioned radially between and are engaged with the sun gear 52 and the ring gear 58. The planet carrier 56 is coupled to the planet gears 54 and rotates relative to the sun gear 52 as the planet gears 54 orbit the sun gear 52. The planet carrier 56 is rotatably fixed to the primary output shaft 30 to rotate therewith and transfer torque therebetween. As a result, when the electric motor 20 is supplying drive torque, the sun gear 52 may function as an input from the electric motor 20 and the planet carrier 56 as an output to the primary output shaft 30. When the electric motor 20 is receiving torque (e.g., functioning as a generator), the planet carrier 56 functions as an input from the primary output shaft 30 and the sun gear 52 as an input to the electric motor 20.

In the free state, the electric motor 20 is operatively decoupled from the primary output shaft 30, such that torque is not transferred between the electric motor 20 and the primary output shaft 30. For example, as the primary output shaft 30 is rotated by the transmission 6, the primary output shaft 30 rotates the planet carrier 56 and, thereby, the ring gear 58 via the planet gears 54, while the sun gear 52 is held generally stationary by the electric motor 20.

In the grounded state, torque is transferable between the electric motor 20 and the primary output shaft 30. For example, with or without the engine 4 also supplying torque, as the electric motor 20 transfers torque to (e.g., rotates) the sun gear 52, the sun gear 52 rotates the planet gears 54 relative to the ring gear 58, such that the planet carrier 56 and, thereby, the primary output shaft 30 are also rotated relative to the ring gear 58. The primary output shaft 30 may also transfer torque to the electric motor 20 (e.g., from the rear axle 8a and/or the front axle 8b) in which case the electric motor 20 functions as a generator (e.g., during regenerative braking). Actuation and modes of operation of the electric motor 20 are discussed in further detail below.

The ring gear 58 is selectively grounded (e.g., rotatably fixed) to the housing 12 with the actuation system 70. The actuation system 70, for example, is configured with a dog clutch or locking sleeve 72 that is moved axially between a rearward position (e.g., free, or disconnected position; see FIGS. 5-6) and a forward position (e.g., fixed, or grounded position; see FIGS. 2-3). The locking sleeve 72 may, for example, have an inner periphery (e.g., circular in cross-section) that is splined in a complementary manner to an outer periphery of the ring gear 58 and also have an outer periphery (e.g., circular in cross-section) that is shaped and splined in a complementary manner to an inner periphery of a locking portion 12a of the housing 12. The locking sleeve 72, the ring gear 58, and the locking portion 12a may be splined (e.g., have splines; not shown) in any suitable manner.

Alternatively, the ring gear 58 may be selectively grounded to the housing 12 in any other suitable manner. For example, the locking sleeve 72 or other locking member may engage and couple to the ring gear 58 in a different manner (e.g., engaging an axial end thereof), and/or engage and couple to the housing 12 in a different manner (e.g., sliding within slots of the housing 12 and/or on track or slide members or portions thereof). The locking sleeve 72 may take other configurations sufficient for selectively grounding the ring gear 58 to the housing 12 and may, for example, be referred to as a locking or grounding member, structure, or ring. The locking portion 12a of the housing 12 may also be referred to as a grounding portion, structure, or member of the housing 12.

In the rearward position (see FIGS. 5-6), the locking sleeve 72 is disengaged from at least one of the ring gear 58 or the housing 12. For example, as shown, the locking sleeve 72 may be biased rearward of both the ring gear 58 and the locking portion 12a of the housing 12. Alternatively, the locking sleeve 72 may be supported by one of the ring gear 58 or the locking portion 12a of the housing 12 in the rearward position (e.g., one of which extends axially rearward further than the other) and axially rearward of the other.

Figure 4:
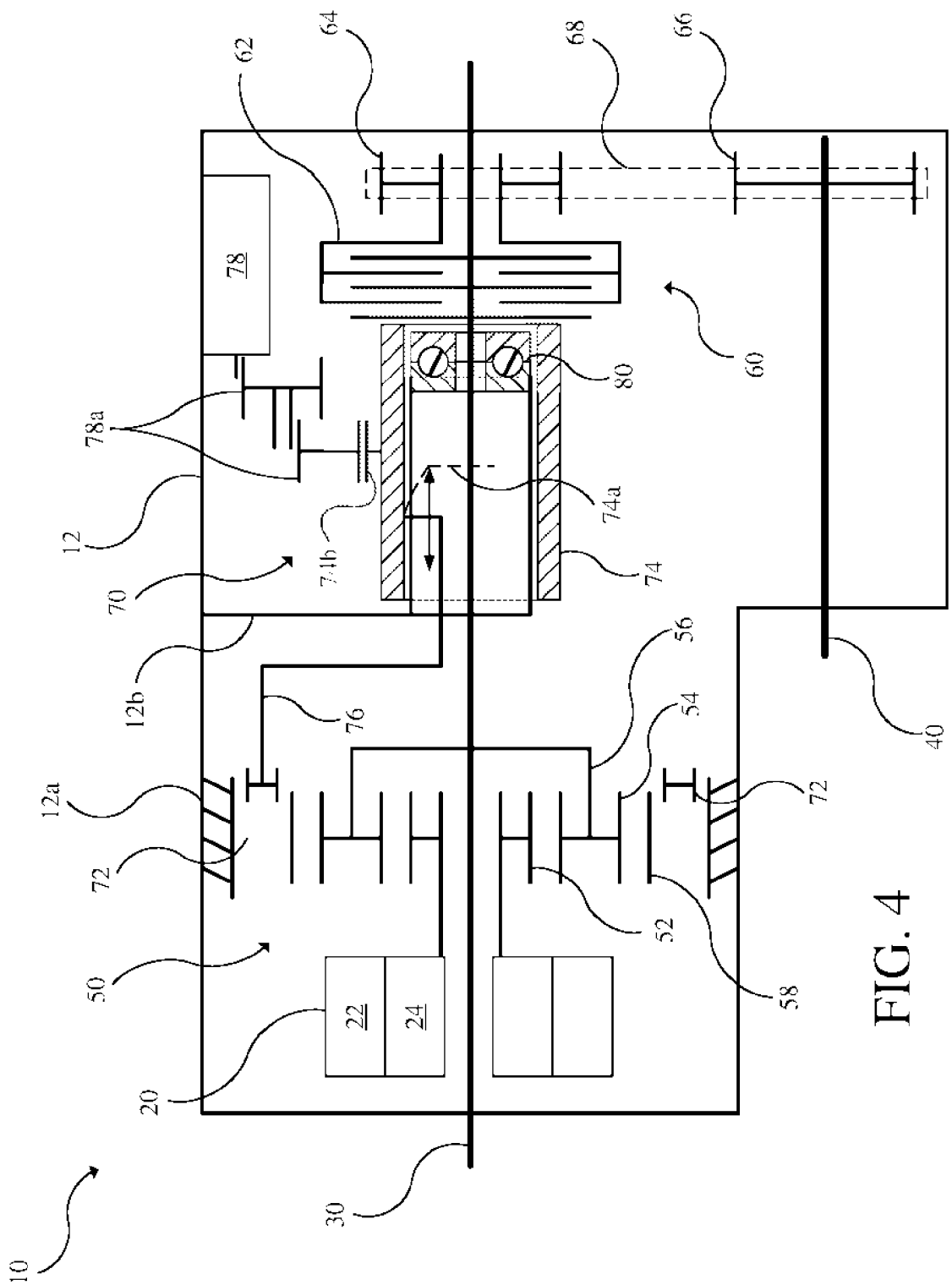
FIG. 4 is a schematic cross-sectional view of the transfer case of FIG. 1 shown in a third configuration.
Figure 5:
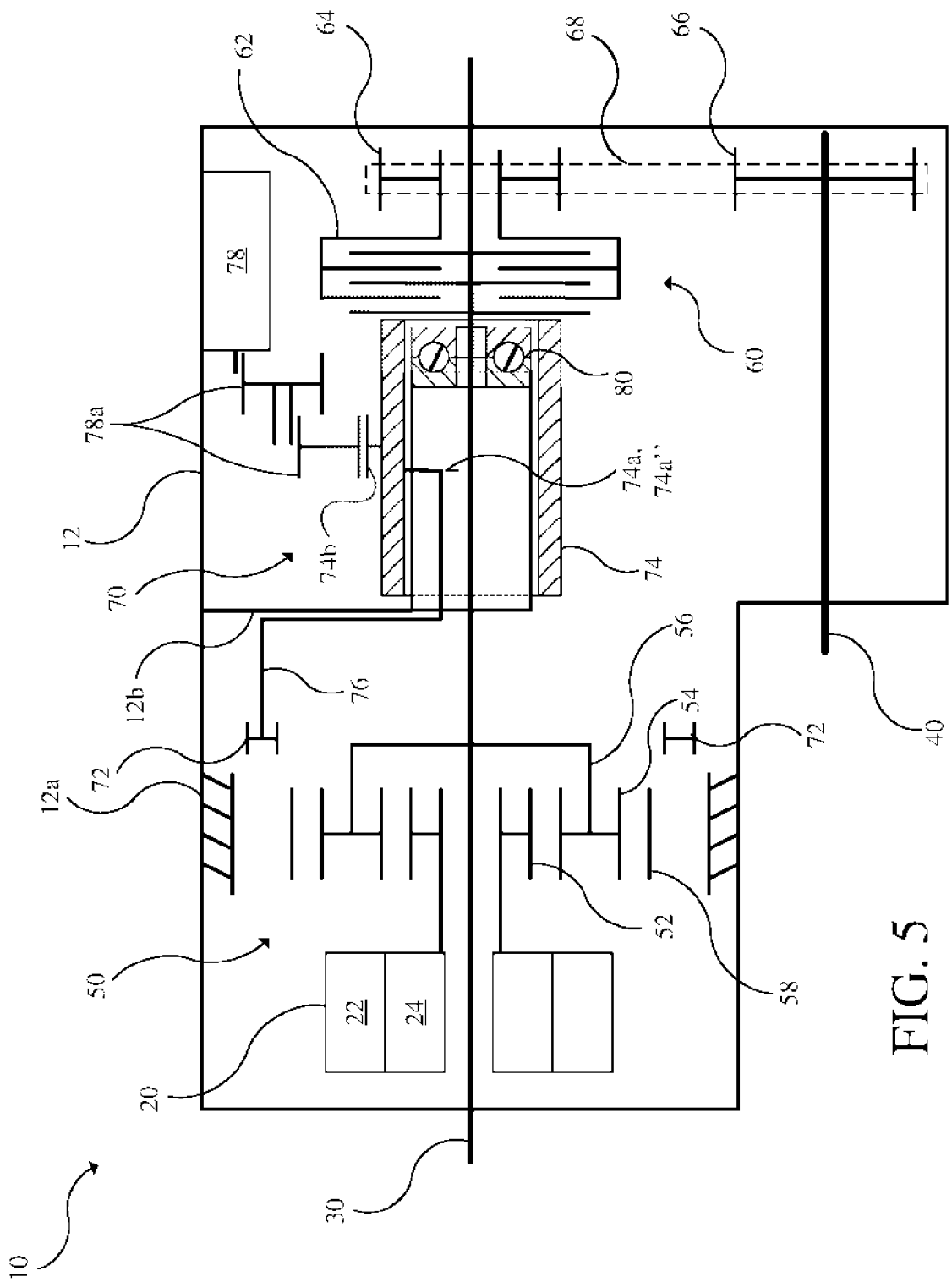
FIG. 5 is a schematic cross-sectional view of the transfer case of FIG. 1 shown in a fourth configuration.
Figure 6:
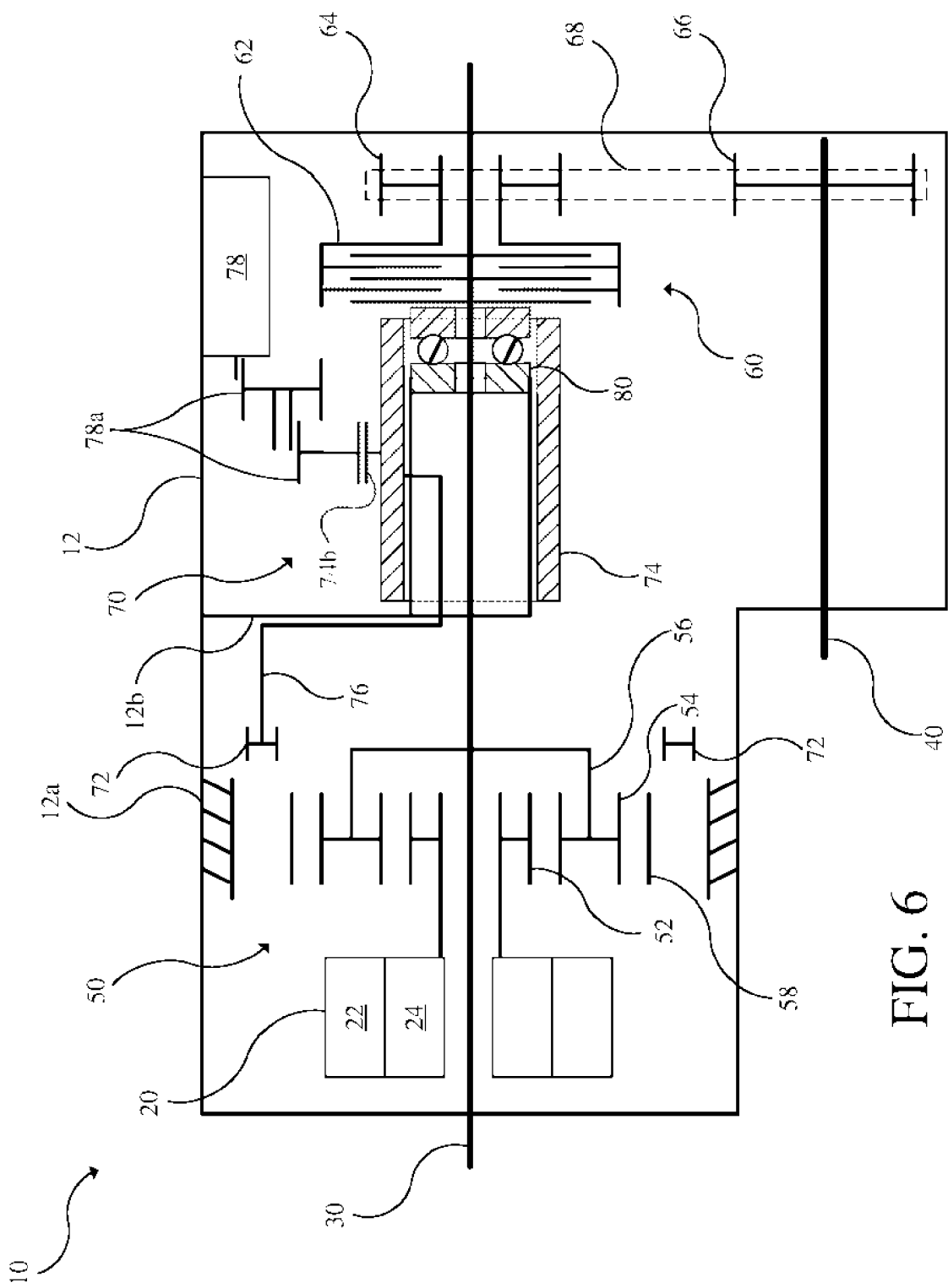
FIG. 6 is a schematic cross-sectional view of the transfer case of FIG. 1 shown in a fifth configuration.

In the forward position (see FIGS. 2-3), the locking sleeve 72 is engaged with both the ring gear 58 and the locking portion 12a of the housing 12 to rotationally fix the ring gear 58 to the locking portion 12a of the housing 12. As shown, the locking sleeve 72 is arranged radially between the locking portion 12a of the housing 12 and the ring gear 58. FIG. 4 depicts the locking sleeve 72 in an intermediate position as the locking sleeve 72 is moved between the rearward position and the forward position.

Alternatively, the locking sleeve 72 may be configured to ground the ring gear 58 while in the rearward position and allow the ring gear 58 to rotate freely of the housing 12 while in the forward position. Furthermore, in either configuration, the forward and rearward positions of the locking sleeve 72 may be referred to as first and second positions, or vice versa.

The actuation system 70 moves the locking sleeve 72 between the rearward position and the forward position. For example, the actuation system 70 may additionally include a barrel cam 74 (e.g., barrel or barrel member) and a fork assembly 76 (e.g., shift fork assembly or structure) that extends between the barrel cam 74 and the locking sleeve 72. Rotation of the barrel cam 74 causes axial movement of the fork assembly 76 and, thereby, the locking sleeve 72.

Figure 7:
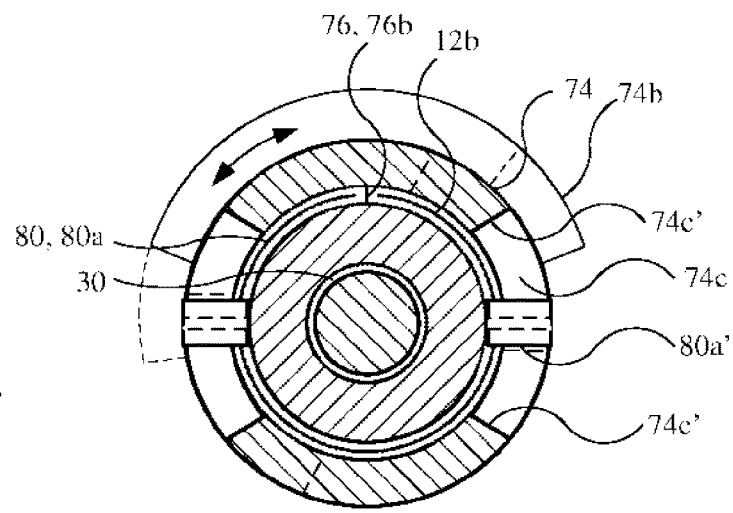
FIG. 7 is a partial cross-sectional view of the transfer case of FIG. 1 taken along line 7-7 in FIG. 3.

The barrel cam 74 is fixed axially and is rotatably supported to be concentric with the primary output shaft 30. For example, the barrel cam 74 may be supported by and rotate around a support member 12b that extends radially inward from the housing 12 and extends axially into the barrel cam 74. For example, as shown in FIG. 7, the support member 12b may have a cylindrical outer periphery that is complementary to the inner periphery of the barrel cam 74, so as to support the barrel cam 74 thereon concentric thereto. The support member 12b additionally includes an axially extending slot (shown in FIG. 7; not labeled) through which a proximal end 76b of the fork assembly 76 protrudes into a cam slot 74*a* of the barrel cam 74. The barrel cam 74 may also be positioned axially between the planetary gear set 50 and the secondary torque transfer mechanism 60 (discussed in further detail below).

The fork assembly 76 is rotationally fixed relative to the housing 12 and slidable axially relative thereto. The fork assembly 76 includes a distal end 76*a* engaging the locking sleeve 72 and the proximal end 76*b* engaging the barrel cam 74. The distal end 76*a* engages the locking sleeve 72 in a manner allowing relative rotation thereof, while also applying axial force in forward and rearward directions to move the locking sleeve 72. The proximal end 76*b* of the fork assembly 76 is received within the cam slot 74*a* (shown in dashed lines in FIGS. 2-6) of the barrel cam 74, which engages and causes axial movement of the fork assembly 76 as the barrel cam 74 is rotated. The cam slot 74*a* protrudes radially outward into an inner periphery of the barrel cam 74. The proximal end 76*b* of the fork assembly 76 also extends radially through the slot of the support member 12*b* as referenced above and as shown in FIG. 7.

The cam slot 74*a* includes at least one movement region 74*a*' extending axially and circumferentially (e.g., in a helical shape) along the inner periphery of the barrel cam 74. As the barrel cam 74 is rotated, the movement region 74*a*' of the cam slot 74*a* engages the proximal end 76*b* of the fork assembly 76 to move the fork assembly 76 axially forward and rearward. The cam slot 74*a* may additionally include one or more dwell regions 74*a*" that extend circumferentially but not axially. As the barrel cam 74 is rotated, the dwell regions 74*a*" of the cam slot 74*a* maintain the proximal end 76*b* of the fork assembly 76 in a constant axial position. The dwell regions 74*a*" may coincide with motion of the actuation system 70 for operating other functions or mechanisms (e.g., the secondary torque transfer mechanism 60 as discussed below).

The barrel cam 74 is selectively rotated by a motor 78 (e.g., actuator motor). For example, the barrel cam 74 includes a sector gear 74*b* on an outer periphery thereof. A plurality of gears 78*a* (e.g., a gear train) are arranged between the motor 78 and the sector gear 74*b* of the barrel cam 74, and function to reduce the speed and increase torque of the motor 78 at the barrel cam 74.

The secondary torque transfer mechanism selectively rotatably (e.g., operatively) couples the primary output shaft 30 to the secondary output shaft 40. The secondary torque transfer mechanism 60 generally includes a plate clutch 62, a primary sprocket 64 rotatably fixed to the plate clutch 62, a secondary sprocket 66 rotatably fixed to the secondary output shaft 40, and a chain 68 extending between the primary sprocket 64 and the secondary sprocket 66. The plate clutch 62 includes a plurality of interleaved plates (shown; not labeled) that are alternatingly rotatingly fixed to the primary output shaft 30 and a clutch housing (not labeled; e.g., clutch drum) to which the primary sprocket 64 is rotationally fixed. A first plate (e.g., a forward plate) may be considered an apply plate that is pressed by the actuator system 70 (discussed further below). When the interleaved plates are compressed, friction increases therebetween to transfer torque between the primary output shaft 30 and the clutch housing of the plate clutch 62. Ultimately, torque is transferred between the primary output shaft 30 and the secondary output shaft via the plate clutch 62 (i.e., the interleaved plates and the clutch housing), the primary sprocket 64, the chain 68, and secondary sprocket 66. A spring (not shown) may press the apply plate away from the interleaved plates (e.g., forward) for the interleaved plates to decompress and to disengage the friction coupling formed thereby.

Alternatively, a variation of the secondary torque transfer mechanism 60 may instead transfer torque between the primary output shaft 30 and the secondary output shaft 40 using gears (e.g., gears being used in place of the primary sprocket 64, the secondary sprocket 66, and the chain 68).

The secondary torque transfer mechanism 60 may also be operated by the actuation system 70. The actuation system 70 additionally includes a face cam mechanism 80 (e.g., ball ramp mechanism), which converts rotation of the barrel cam 74 into axial displacement for compressing the plate clutch 62 (e.g., engaging the apply plate or thrust bearing therebetween). The face cam mechanism 80 may, for example, be a ball ramp mechanism having a rearward member 80*a* (e.g., first member), a forward member 80*b* (e.g., second member), and a plurality of intermediate members 80*c* (e.g., rolling members, such as balls) therebetween. The forward member 80*b* is fixed axially (e.g., to the support member 12*b*), while the rearward member is rotatable by the barrel cam 74. Axially opposed surfaces of the rearward member 80*a* and the forward member 80*b* are ramped or inclined, such that relative rotation of the rearward member 80*a* relative to the forward member 80*b* causes the rearward 80*a* member to move axially relative thereto. The rearward member 80*a* and the forward member 80*b* may instead be referred to as plates or rings.

The rearward member 80*a* is rotated, for example, by including radially-extending members 80*a*' that are engaged by the barrel cam 74. As shown in FIG. 7, the rearward member 80*a* includes radially-extending members 80*a*' that are positioned within slots 74*c* in a rearward end of the barrel cam 74. When the barrel cam 74 is rotated for the ends 74*c*' of the slots 74*c* to engage the radially-extending members 80*a*' (depicted in dashed lines in FIG. 7), the rearward member 80*a* is rotated and displaces axially away from the forward member 80*b*, while the radially-extending members 80*a*' slide along the ends 74*c*' of the slots 4*c*. When rotated in an opposite direction, the apply plate (via the spring reference above) presses the rearward member 80*a* forward for the plate clutch 62 to be disengaged.

Figure 8:
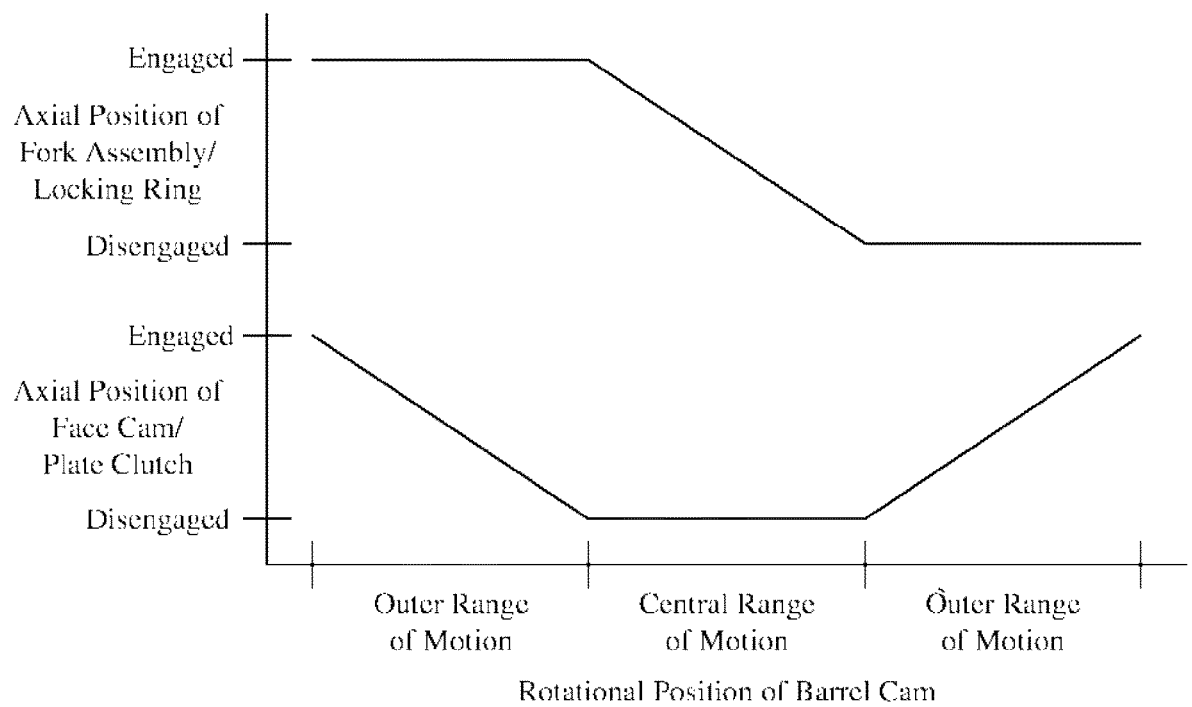
FIG. 8 is a plot of operation of an actuation system of the transfer case shown in FIG. 2.

Additionally referring to the plot shown in FIG. 8, the barrel cam 74 provides a central range of motion in which the fork assembly 76 and the locking sleeve 72 move axially between engaged and disengaged positions but in which the plate clutch 62 is not operated (remains disengaged), and outer ranges of motion in which the fork assembly 76 and the locking sleeve 72 are stationary (remaining either engaged or disengaged) and in which the face cam mechanism 80 and plate clutch 62 move axially (i.e., to become engaged). More particularly, the slots 74*c* provide the central range of motion of the barrel cam 74 in which the rearward member 80*a* is not moved by the barrel cam 74, which coincides with the barrel cam 74 causing movement of the fork assembly 76 and the locking sleeve 72. For example, in the central range of motion, the proximal end 76*b* of the fork assembly 76 is engaged with the movement region 74*a*' of the cam slot 74*a* of the barrel cam 74.

In the outer ranges of motion, the rearward member 80*a* is moved by the barrel cam 74 (i.e., with ends 74*c*' of the slots 74*c* engaging the radially-extending members 80*a*'), which coincides with the barrel cam 74 not moving fork assembly 76 and the locking sleeve 72. For example, in the outer ranges of motion, the proximal end 76*b* of the fork assembly is engaged with the dwell regions 74*a*" of the cam slot 74*a* of the barrel cam 74. The two dwell regions 74*b*"

are positioned at either end of (e.g., surround) the single movement region 74a' of the cam slot 74a of the barrel cam 74. The central and outer ranges of motion may, for example, be between approximately 30 and 50 degrees, or any other suitable range. The central and outer ranges of motion may be non-overlapping (i.e., exclusive) as shown.

Alternatively, a central range of motion of the barrel cam 74 may be associated with operation of the plate clutch 62, while one or more outer ranges of motion of the barrel cam 74 may be associated with operation of the locking sleeve 72. In this case, a variation of the barrel cam 74 instead includes a cam slot having a central dwell region surrounded by movement regions.

As referenced above, the vehicle 1 may be operated in various drive modes, which provide different combinations of engine drive (i.e., motive power being provided by the engine 4), electric drive (i.e., motive power being provided by the electric motor 20), and regeneration (i.e., the electric motor 20 being driven to recharge the battery 9). For example, the vehicle 1 may be operated in an electric driving mode, an electric regeneration mode, a combined engine and electric drive mode, a combined engine drive and electric regeneration mode, an engine drive mode, and a back EMF disconnect mode. Additionally, in each of these drive modes, the vehicle 1 may be in two-wheel drive (i.e., in which case the secondary output shaft 40 is rotatably disconnected form the primary output shaft 30) and four-wheel drive (i.e., in which case the secondary output shaft 40 is rotatably coupled to the primary output shaft 30 with the secondary torque transfer mechanism 60).

In the electric drive mode, the electric motor 20 provides drive torque to the primary output shaft 30, while the engine 4 does not. The ring gear 58 is grounded to the housing 12 of the transfer case 10 as described above. The electric motor 20 receives electric power from the battery 9, and provides torque to the primary output shaft 30 via the planetary gear set 50 as described above. The transmission 6 is in neutral, such that no torque is transferred from the engine 4 to the transfer case 10.

In the electric regeneration mode, the electric motor 20 receives torque from the primary output shaft 30 (via the planetary gear set 50) and is rotated thereby to generate electricity for charging the battery 9. The ring gear 58 and the transmission 6 are configured as in the electric drive mode with the ring gear 58 being grounded to the housing 12 of the transfer case 10, and the transmission 6 being in neutral.

In the combined engine and electric drive mode, both the engine 4 and the electric motor 20 provide drive torque to the primary output shaft 30. The transmission 6 is in a drive gear to transfer torque from the engine 4 to the primary output shaft 30. The ring gear 58 is grounded to the housing 12 of the transfer case 10 as described above, and the electric motor 20 receives electric power from the battery and provides drive torque to the primary output shaft 30 via the planetary gear set 50.

In the engine drive and electric regeneration mode, the engine 4 provides drive torque to the primary output shaft 30, and the electric motor 20 receives torque from the primary output shaft 30 to be rotated thereby. The ring gear 58 and the transmission 6 are configured as in the combined engine and electric drive mode (i.e., the ring gear 58 being grounded, and the transmission 6 being in a drive gear).

In the engine drive mode, the engine 4 provides drive torque to the primary output shaft 30, while the electric motor 20 is operatively decoupled from the primary output shaft 30. The ring gear 58 is disconnected from the housing 12 to rotate freely thereof. The transmission 6 is in a drive gear.

In the back EMF disconnect mode, the electric motor 20 is operatively decoupled from the primary output shaft 30 (i.e., with the ring gear 58 being disconnected from the housing 12 to rotate freely thereof) regardless of whether the engine 4 provides torque to the primary output shaft 30. For example, when the vehicle 1 is moving at high speeds, whether coasting or driven by the engine 4, the powertrain 2 may be operated in the back EMF disconnect mode.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A transfer case comprising:
   a primary output shaft that receives torque from a drive source external to the transfer case, the primary output shaft providing a primary torque output of the transfer case;
   an electric motor having a rotor and a stator that are internal to the transfer case;
   a planetary gear set having a sun gear rotatably fixed to the rotor, a ring gear, planet gears arranged radially between and engaging the sun gear and the ring gear, and a planet carrier coupled to the planet gears and rotatably fixed to the primary output shaft, wherein the ring gear is selectively groundable for selectively transferring torque between the electric motor and the primary output shaft;
   a housing and a locking ring, wherein the ring gear is selectively grounded to the housing with the locking ring;
   wherein the locking ring is movable axially between a first position in which the locking ring grounds the ring gear to the housing and a second position in which the locking ring allows the ring gear to rotate freely of the housing; and
   an actuator system having the locking ring, a barrel cam, and a fork assembly extending between the locking ring and the barrel cam, wherein rotation of the barrel cam moves the locking ring with the fork assembly between the first position and the second position.

2. The transfer case of claim 1, wherein the barrel cam is concentric with the primary output shaft and is located axially rearward of the planetary gear.

3. The transfer case of claim 2, further comprising:
   a secondary output shaft that provides a secondary torque output of the transfer case; and
   a secondary torque transfer mechanism for selectively transferring torque between the primary output shaft and the secondary output shaft, wherein the secondary torque transfer mechanism includes a plate clutch that is selectively compressed by the actuator system with rotation of the barrel cam to selectively transfer torque between the primary output shaft and the secondary output shaft.

4. The transfer case of claim 1, further comprising:
   a housing and a locking ring, wherein the locking ring is movable axially between a first position in which the locking ring grounds the ring gear to the housing and a second position in which the locking ring allows the ring gear to rotate freely of the housing;

an actuator system having the locking ring, a barrel cam, and a fork assembly extending between the locking ring and the barrel cam, wherein rotation of the barrel cam moves the locking ring with the fork assembly between the first position and the second position, and the barrel cam is concentric with the primary output shaft and is located axially rearward of the planetary gear;

a secondary output shaft that provides a secondary torque output of the transfer case; and a secondary torque transfer mechanism for selectively transferring torque between the primary output shaft and the secondary output shaft, wherein the secondary torque transfer mechanism includes a plate clutch that is selectively compressed by the actuator system with rotation of the barrel cam to selectively transfer torque between the primary output shaft and the secondary output shaft, and the actuation system includes a motor and rotation of the motor in a first range of motion selectively grounds the ring gear and in a second range of motion exclusive of the first range of motion to selectively operates the secondary torque transfer mechanism;

wherein the electric motor is concentric with the primary output shaft.

5. A transfer case comprising;

a primary output shaft that receives torque from a drive source external to the transfer case, the primary output shaft providing a primary torque output of the transfer case;

an electric motor having a rotor and a stator that are internal to the transfer case;

a planetary gear set having a sun gear rotatably fixed to the rotor, a ring gear, planet gears arranged radially between and engaging the sun gear and the ring gear, and a planet carrier coupled to the planet gears and rotatably fixed to the primary output shaft, wherein the ring gear is selectively groundable for selectively transferring torque between the electric motor and the primary output shaft; and a secondary output shaft that provides a secondary torque output of the transfer case, a secondary torque transfer mechanism for selectively transferring torque between the primary output shaft and the secondary output shaft, and an actuation system for selectively grounding the ring gear and selectively operating the secondary torque transfer mechanism.

6. The transfer case of claim 5, wherein the actuation system includes a motor and rotation of the motor in a first range of motion selectively grounds the ring gear and in a second range of motion selectively operates the secondary torque transfer mechanism.

7. The transfer case of claim 6, wherein the actuation system includes a barrel cam and a face cam operatively coupled to the barrel cam, wherein the motor rotates the barrel cam in a first range of motion to selectively ground the ring gear and rotates the barrel cam in a second range of motion to cause the face cam to selectively operate the secondary torque transfer mechanism.

8. The transfer case of claim 7, wherein the actuation system includes a locking ring that is moved axially between a first position in which the locking ring grounds the ring gear and a second position in which the locking ring does not ground the ring gear, and wherein the secondary torque transfer mechanism includes a plate clutch that is selectively compressed by the face cam to selectively operate the secondary torque transfer mechanism.

9. The transfer case of claim 6, wherein the first range of motion is exclusive of the second range of motion.

* * * * *